US012643732B2

(12) United States Patent
Velagic et al.

(10) Patent No.: US 12,643,732 B2
(45) Date of Patent: Jun. 2, 2026

(54) POURING ATTACHMENT DEVICE FOR A BEVERAGE CONTAINER

(71) Applicant: Diageo Ireland Unlimited Company, Dublin (IE)

(72) Inventors: Haris Velagic, Dublin (IE); Gerald Gillen, Dublin (IE); James Ryan, Dublin (IE); Christopher Murphy, Dublin (IE); Paul Smith, Dublin (IE); Stephen Hendron, Dublin (IE); Steve Gilsenan, Dublin (IE)

(73) Assignee: Diageo Ireland Unlimited Company, Dublin (IE)

( * ) Notice: Subject to any disclaimer, the term of this patent is extended or adjusted under 35 U.S.C. 154(b) by 312 days.

(21) Appl. No.: 18/039,437

(22) PCT Filed: Feb. 22, 2022

(86) PCT No.: PCT/EP2022/054427

§ 371 (c)(1),
(2) Date: May 30, 2023

(87) PCT Pub. No.: WO2022/180050

PCT Pub. Date: Sep. 1, 2022

(65) Prior Publication Data

US 2024/0034547 A1 Feb. 1, 2024

(30) Foreign Application Priority Data

Feb. 23, 2021 (GB) ..................................... 2102547

(51) Int. Cl.
*B65D 85/73* (2006.01)
*B67D 1/12* (2006.01)

(52) U.S. Cl.
CPC ............... *B65D 85/73* (2013.01); *B67D 1/12* (2013.01)

(58) Field of Classification Search
CPC .... B05B 1/02; B05B 1/06; B05B 1/08; B05B 1/12; B05B 17/06; B65D 77/068;
(Continued)

(56) References Cited

U.S. PATENT DOCUMENTS 4,042,174 A * 8/1977 Vaughn ..................... B05B 1/12 239/722
8,172,115 B1 * 5/2012 Mulhauser ............ B05B 11/061 239/338

(Continued)

FOREIGN PATENT DOCUMENTS

CN 103318517 9/2013
CN 203997562 10/2014

(Continued)

OTHER PUBLICATIONS

ISR from corresponding PCT/EP2022/054427.
Search report from corresponding application No. GB2102547.3.
ISR from PCT/EP2022/054427.

*Primary Examiner* — Tuongminh N Pham

(74) *Attorney, Agent, or Firm* — Stephen T. Scherrer; Monique A. Morneault; Scherrer Patent & Trademark Law, P.C.

(57) ABSTRACT

A pouring attachment device for a disposable package of nitrogenated beverage, e.g. an aluminium can P, that achieves a desirable foam head when the beverage is poured into a glass. The attachment comprises a main body or housing (11), an ultrasonic wave generator (27) and a means to couple the device to the package, such as a rim seal (2)0. A flow channel has a contoured inlet (26) configured for communicating beverage from the package to an outlet (21), via a resonance chamber (28), and is particularly configured for minimising turbulence.

13 Claims, 9 Drawing Sheets

(58) Field of Classification Search

CPC .... B65D 75/5872; B65D 25/40; B65D 25/42; B65D 25/48; B65D 5/72–76; B65D 85/73; B65D 47/04; B65D 47/068; B65D 47/06–185; B67C 11/02; B67D 7/005; B67D 1/1411; B67D 1/1416; B67D 1/12; B67D 1/1275

See application file for complete search history.

(56) References Cited

U.S. PATENT DOCUMENTS

| | | | | |
|---|---|---|---|---|
| 2005/0229674 | A1 | 10/2005 | Smith et al. | |
| 2006/0144871 | A1 | 7/2006 | Van Tuyl et al. | |
| 2015/0201732 | A1 * | 7/2015 | Kakon | A45D 33/02 222/333 |

FOREIGN PATENT DOCUMENTS

| | | |
|---|---|---|
| CN | 205186959 | 4/2016 |
| CN | 105668046 | 6/2016 |
| CN | 205441475 | 8/2016 |
| CN | 205555093 | 9/2016 |
| CN | 106185064 | 12/2016 |
| CN | 205872904 | 1/2017 |
| CN | 205872905 | 1/2017 |
| CN | 107640454 | 1/2018 |
| CN | 207046111 | 2/2018 |
| CN | 207174496 | 4/2018 |
| CN | 106081380 | 5/2018 |
| CN | 207550985 | 6/2018 |
| CN | 207658416 | 7/2018 |
| CN | 208746726 | 4/2019 |
| CN | 209023504 | 6/2019 |
| CN | 110914192 | 3/2020 |
| JP | 2018122892 | 8/2018 |
| WO | 2004011362 | 2/2004 |
| WO | 2018066703 | 4/2018 |
| WO | 2018163429 | 9/2018 |
| WO | 2012093517 | 7/2021 |

* cited by examiner

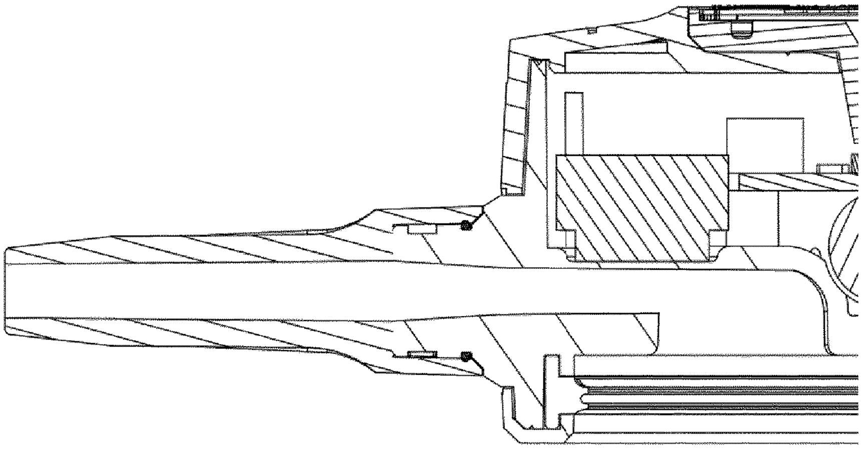
Fig. 15.
Fig. 16.
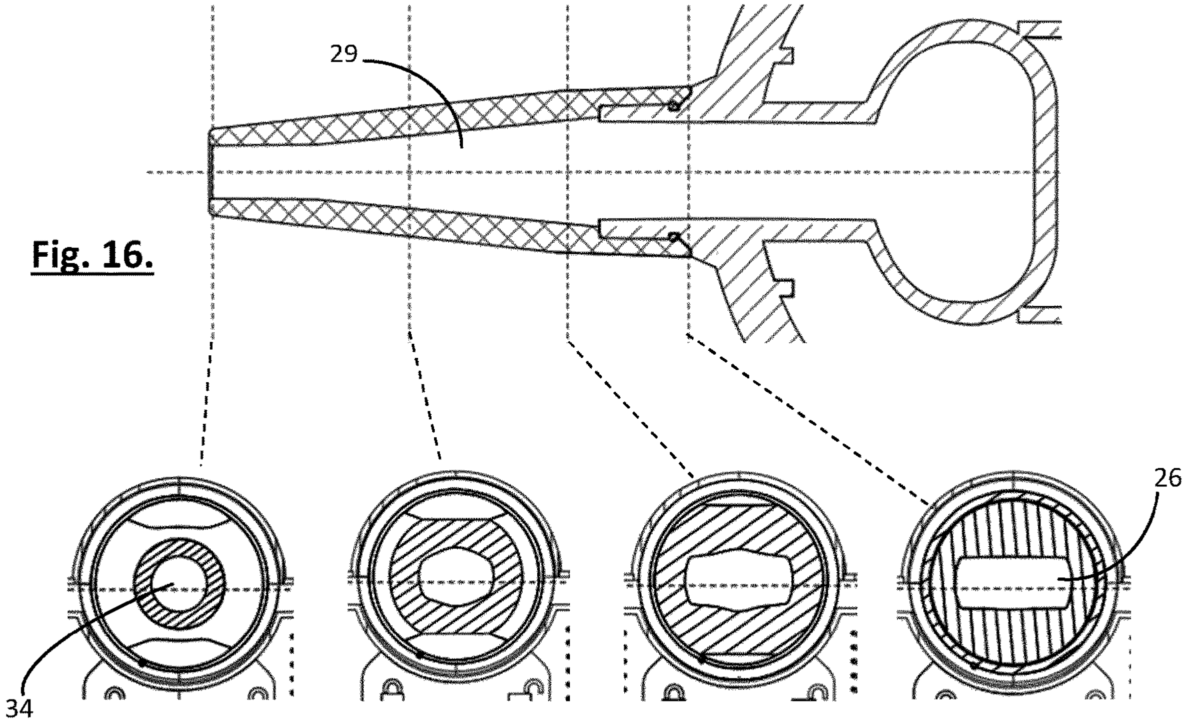

POURING ATTACHMENT DEVICE FOR A BEVERAGE CONTAINER

TECHNICAL FIELD

The present invention relates to a pouring attachment device for a beverage container, especially a nitrogenated beverage container, e.g. an aluminium can.

BACKGROUND TO THE INVENTION

A nitrogenated beverage, such as stout beer (e.g. Guinness®), requires agitation at the time of dispense to form a desirable, creamy head. In a bar environment, beverage is delivered under pressure to a glass from a storage vessel with a multi-serve volume, such as a keg. The delivery line passes through a "creamer plate", i.e. a plurality of restricted apertures, where nitrogen breaks out of solution and encourages further nucleation to form tiny bubbles. In the glass these bubbles rise to the surface and result in a desirable and characteristic creamy head.

A creamy head can be replicated in unitised versions of the beverage, i.e. aluminium cans and bottles, by supplying a 'widget' within the pack, usually floating on the liquid. A widget develops an internal pressure during the filling/sealing process that causes, upon opening the pack, a jet to provide an agitation function. A widget is a "one-shot" solution and complicates recycling of the pack. Furthermore, while generally satisfactory to a consumer, the resultant pouring experience is not optimal, and nor is the head formed.

A known alternative foaming method involves use of an ultrasonic transducer. In such a system the beverage is exposed to ultrasonic waves that cause agitation and, hence, formation of foam. WO2004011362 describes use of an ultrasonic plate that causes agitation in a nitrogenated beverage, within a glass, in order to form a creamy head. The ultrasonic plate must be provided with a pool of water, or other means of making good contact, in order for the ultrasonic waves to effectively pass through the thick base of the glass. The resultant head is generally satisfactory but not optimal. Also, as with a widget, it is not possible to replicate the "two-part pour" that is desirable to achieve optimal characteristics of a stout beverage such as Guinness®.

Ultrasonic devices are also known to assist foaming in other beverage products. For example, "bubbler" devices are known that couple to the opening end of an aluminium can package. A beverage, e.g. carbonated lager, is poured through the bubbler device where it is subjected to ultrasound, enhancing froth formation as it is delivered to a glass. The pour can drain the pack all at once, with ultrasound/foam applied by the press of a button when needed, or in multiple pours so long as carbon dioxide remains dissolved in the liquid.

A device of this type will also cause agitation and subsequent bubble formation in a nitrogenated beverage; however, it has been found that the resultant head is highly undesirable. There is no present can-attached ultrasound solution for delivering a nitrogenated beverage into a vessel while achieving a desirable creamy head.

It is noteworthy that a "nitrogenated beverage" as discussed herein often includes another gas in solution, such as carbon dioxide. However, small bubbles and a creamy head are characteristic of the presence of nitrogen gas in an effective concentration.

SUMMARY OF THE INVENTION

The present invention seeks to provide an alternative agitation device to a widget and evolution over known "bubbler" devices, suitable for re-use with a single unit pack of nitrogenated beverage. At least the invention will provide the public with an alternative agitation means for nitrogenated beverages.

In a broad aspect of the invention, a pouring attachment for a disposable container of beverage is described herein. Embodiments possess a common inventive concept, namely provision of a flow channel that is configured for minimising turbulence, such that the devices are particularly suited for delivering nitrogenated beverages, although the choice of beverage is up to a user.

The pouring attachment is a device that consists of a sealed electronic assembly configured to be coupled securely, i.e. sealed to avoid unintended leakage, to a beverage pack. Preferably the tab has been opened by the consumer before coupling, however, alternative forms may incorporate a structure to pierce a can end and open communication with the pouring attachment.

In one form a lower part, underside, of the assembly contains a hollow chamber that aligns to an opening of the can and facilitates a flow path to an outlet, e.g. protruding nozzle. Once in position, the lower part seals to the can end, e.g. by virtue of an o-ring seal, such that tilting the can allows the liquid to be poured into a glass via a nozzle. In one form a vent is provided, diametrically opposed to the outlet/nozzle, for venting the container volume to atmosphere.

In one form, at least part of the assembly is fully sealed against moisture ingress and houses an electronic circuit with an ultrasonic transducer/actuator. The actuator preferably contacts (e.g. by an adhesive) the wall of the liquid chamber/flow path directly such that, while pouring, ultrasonic waves are transmitted through the wall of the chamber to the beer flowing inside. This has the effect of breaking the nitrogen gas out of solution simultaneously with pouring of the beverage into a vessel.

According to the invention, the beverage path from container to glass consists of a smooth walled conduit to minimise turbulence. In the production of a desirable head it has been found to be important to minimise turbulence because this produces consistency and small bubbles in the head that ultimately forms in the glass. Turbulence, by contrast, results in inconsistency, larger bubbles and a head that is poorly formed and/or more quickly collapses.

Turbulence has been found to be managed in the present invention by a combination of features incorporated into the beverage flow path. For example, an inlet (i.e. recessed and/or forming a chamber) should have a contoured wall in order to direct flow smoothly, with minimised turbulence, to a first length (or section) of a flow channel that has a substantially constant cross-section, preferably letterbox-shaped, which is located against the ultrasonic transducer for efficient energy transfer. The first length and cross section of the flow channel/bore serves as a "resonance chamber." Downstream of the first length, at a second section/length, the cross-sectional area may increase (e.g. by a tapered wall and widening cross section) which serves to slow the fluid velocity. The widened area (or directly from the first section) may then transition downstream (e.g. to a third length where the cross-sectional area reduces) toward a minimum size at an outlet end. By way of example, the resonance chamber may have approximate dimensions of 9.2×4.2 mm (38.6 $mm^2$), widening to a 10.5 mm diameter bore (86.6 $mm^2$). The outlet may narrow to 5.0 mm diameter (19.6 $mm^2$). As such, the transitional cross-sectional area of the second length may increase approximately twofold, e.g. 1:1.5 to 1:3. One of the illustrated examples increases 1:2.24. The ratio of width to height of the resonance chamber, in the example, is 1:2.2, i.e. in a range of 1:1.5 to 1:2.5.

In an alternative form, the first section of the channel, downstream of the inlet and having a letterbox cross section of approximately 40 $mm^2$ after the ultrasound unit, may smoothly transition to an outlet end over a length sufficient to minimise turbulence. The outlet end, by way of example, may be 12 $mm^2$, i.e. approximately one quarter of the cross sectional area.

The overriding design consideration of the flow channel is to minimise turbulence while ensuring sufficient contact time in the resonance chamber. The narrowed outlet, compared to upstream sections of the flow channel, slows flow to increase contact time.

The flow path may integrate an, optionally removable, conical nozzle that converges the liquid flow into a steady stream at its outlet end as noted above. In one form the nozzle defines a the third section of the flow channel, but the second section may be omitted and the narrowing nozzle section may interface directly with the letterbox shape of the first section/resonance chamber. As mentioned above, reduced turbulence and a suitable nozzle combine to minimise large air bubbles which are known to detract from a desirable head on a nitrogenated beverage at serve. The nozzle may be in a horizontal orientation, arranged vertically, or any angle in between; including the possibility of an adjustable angle nozzle via a hinge or the like.

According to an alternative expression of the invention, there may be provided a pouring attachment device for a disposable container of beverage comprising: a housing; an ultrasonic wave generator; a coupling feature for coupling to a container; a flow channel configured for minimising turbulence of poured beverage, the flow channel comprising: an inlet recess, upstream of the ultrasonic wave generator and configured for communicating beverage from the container toward an outlet, the inlet recess having a contoured wall for directing beverage flow in a manner that minimises turbulence; a resonance chamber having a first cross section, downstream of the inlet recess, a surface of the ultrasonic wave generator being arranged at least partially overlapping against the resonance chamber; a nozzle having a distal outlet end of reduced cross-sectional area compared to the first cross sectional area; wherein walls of the flow channel are configured to smoothly transition from the resonance chamber toward the distal outlet end in a manner that minimises turbulence.

The optionally detachable nozzle may include an upstream generally elongate/letterbox shape cross section to interface with the generally elongate/letterbox shape of the resonance chamber. In one form, the downstream distal outlet end of the nozzle is a different cross-sectional shape, e.g. circular, reduced in area from the upstream generally elongate/letterbox shape cross section.

It is noteworthy that the common inventive concept of the various embodiments described herein generally revolves around a recognition to minimise turbulence between an inlet recess/resonance chamber and an outlet, which particularly suits the device for pouring a nitrogenated beverage and forming a consistent creamy head of small bubbles thereon, as opposed to also including larger bubbles that form as a result of turbulence. The inventive concept is achieved by ensuring that the transition between varying cross-sectional areas in the flow path are gradual, with no abrupt or semi-abrupt visible steps, that may cause disturbance in the liquid and introduce turbulence.

A coupling feature of the pouring attachment, e.g. that integrates a sleeve and/or seal for coupling with a beverage pack, may be a fixed size (e.g. diameter) or, in alternative forms, be configured to couple with a range of beverage pack sizes/diameters.

Compared to prior art such as a widget solution, the format of the invention is 'on demand' such that the consumer can replicate a two-part pour usually only associated with an on-trade experience. It is also possible to pour smaller volumes for consumption, such as a "half-pint" from a pint package (a "pint" being approximately 0.57 L in metric units). The remaining beverage can be poured at a later time and still successfully foam, so long as nitrogen remains in solution. The beverage may be a stout beer, cocktail or other alcoholic and non-alcoholic beverage products.

Pouring by an attachment according to the invention is intuitive to use and easy to control, resulting in a high-quality dispense, sustained surge and excellent head formation. These factors combine to create an improved user experience for the consumer compared to widget-based packs. Furthermore, the pouring attachment of the invention is especially suited to nitrogenated beverages, whereas prior art bubbler devices known for carbonated beverages are not.

After use, the device is easily removed from the can for application to a next packaging unit or for cleaning. The aluminium beverage can package, being substantially one material and not including a plastic insert, is easily recyclable. To aid cleaning, the nozzle can be removed from the assembly and cleaned. The remaining electronic assembly is preferably sealed to IP67 standards, and so can be easily cleaned under a running tap without risk of damage.

In one form the device utilises rechargeable NiMh cells that can be easily charged via a micro USB port. Such a port preferably has a waterproof rubber cover. By its nature the invention is reusable and, with energy saving considerations, may be activated to create a head on dozens of pours before recharge is needed. Energy can be conserved, for example, by using pulsed activation spread over a period of time to create a consistent pour of liquid. Other variants may allow for a manual switch to allow for different pouring effects and length. Compared to a mains-powered "surger" device where ultrasound must travel through several layers (e.g. a metal platform, pooled water, thick glass base, beverage), a pouring attachment according to the invention consumes a fraction of the energy.

The device described herein is particularly adapted for encouraging a chain reaction of bubble nucleation in nitrogenated beverages for production of a smooth, creamy head. However, the apparatus can be employed as an alternative to known bubbler devices that foam carbonated beverages. In one form as mentioned, the ultrasonic transducer need not be activated over a full pouring period. Ultrasonic energy may be pulsed or activated for a limited shortened period of pour, suitable for encouraging the chain reaction. Control over surge can be achieved manually by pressing and holding a button accessible on the device and/or by a processor programmed with suitable time-based dispense instructions.

BRIEF DESCRIPTION OF THE DRAWINGS

FIG. 15 illustrates a side section view of the device from FIG. 14;

FIG. 16 illustrates a plan section view of the device from FIG. 14, including cross-section slices through the flow path;

DETAILED DESCRIPTION OF THE INVENTION

The following description presents an exemplary embodiment and, together with the drawings, serves to explain principles of the invention. However, the scope of the invention is not intended to be limited to the precise details of the embodiments or exact adherence with all components, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive.

Descriptive terms should also be given the broadest possible interpretation; e.g. the term “comprising” as used in this specification means “consisting at least in part of” such that interpreting each statement in this specification that includes the term “comprising”, features other than that or those prefaced by the term may also be present. Related terms such as “comprise” and “comprises” are to be interpreted in the same manner. Directional terms such as “vertical”, “horizontal”, “up”, “down”, “upper” and “lower” may be used for convenience of explanation, usually with reference to the illustrations, and are not intended to be ultimately limiting if an equivalent function can be achieved with an alternative dimension and/or direction.

The description herein refers to embodiments with particular combinations of features, however, it is envisaged that further combinations and cross-combinations of compatible features between embodiments will be possible. Indeed, isolated features may function independently as an invention from other features and not necessarily require implementation as a complete combination to have advantages over prior art.

Figure 1:
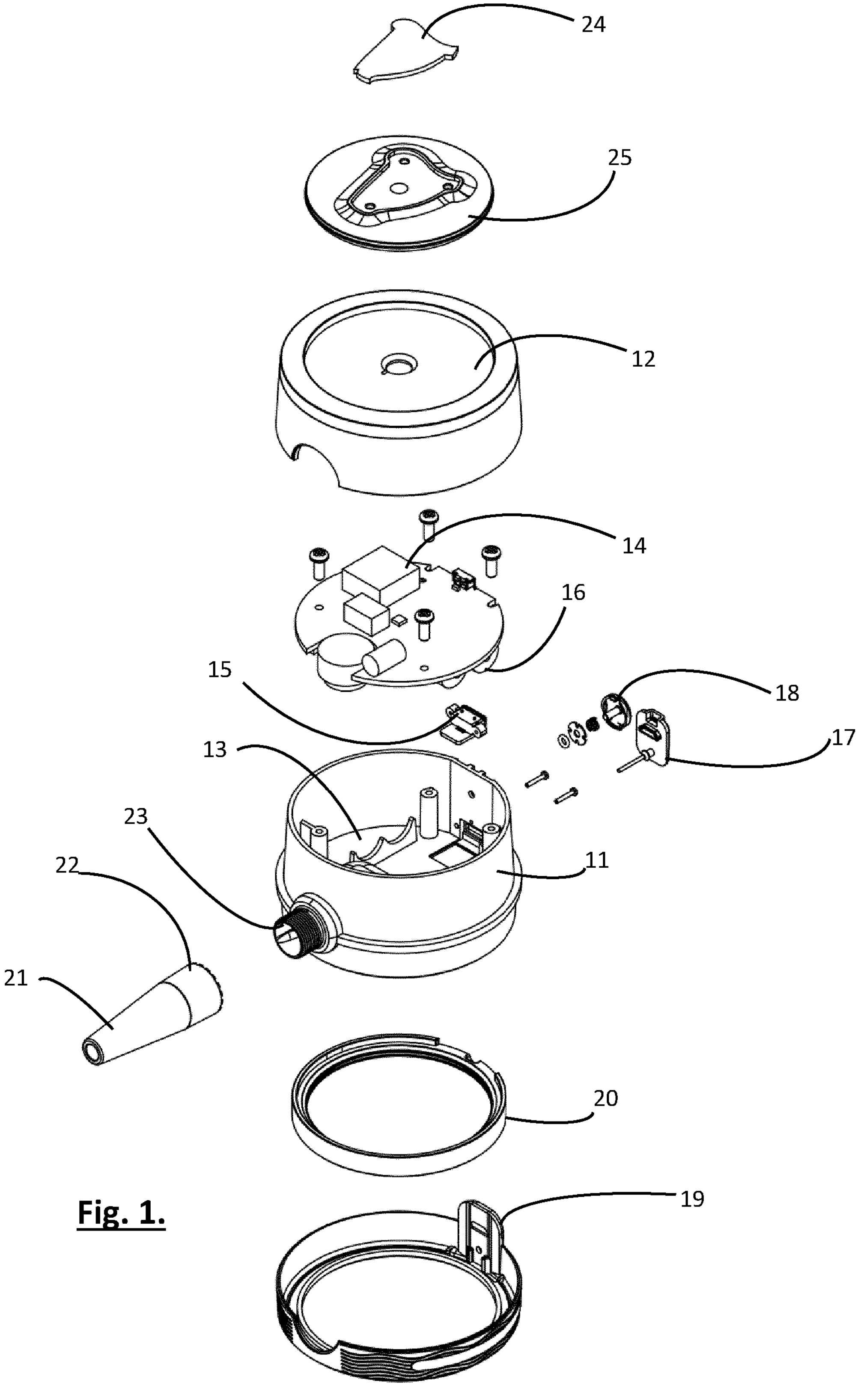
FIG. 1 illustrates an exploded view of components for a pouring attachment device with surging capability according to a first embodiment of the invention.

Referring to FIG. 1, where the general parts of a pouring attachment according to the invention are visible in exploded view, a main body 11 with a cover 12 and an internal floor/wall 13 forms a cavity that houses non-user accessible components such as a printed circuit board assembly (PCBA) 14. A USB port/PCB 15 provides charging capability to a battery 16 of the PCBA, externally sealable by a grommet 17. On a rear aspect of the device, adjacent grommet 17, a press button 18 enables user input/control to the device. Other components associated with the PCBA 14 are discussed further below.

A base 19 of the device is attachable (and/or may be welded) to mating features at a lower end of body 11 and mounts a sealing element 20 (e.g. in the form of an o-ring with surface features to mate with base 19). Base 19 provides a rigid annular structure for coupling to a generally cylindrical beverage package in combination with element 20 having a smaller internal diameter than the package for an interference fit.

A removable nozzle 21 may be internally threaded at a device coupling end 22, for removable attachment with an outlet 23 of the body 11. Alternative removable attachment mechanisms such as a bayonet connection are also possible. A liquid/resonance chamber/inlet 26, formed externally (on the other side to that visible in FIG. 1) of the floor 13 of body 11 communicates with outlet 23 and nozzle 21 for dispense, as will be described hereinafter.

For decorative and identification purposes, a brand plate 24 and/or badge 25 is provided for attachment or embossed into cover 12.

Figure 2:
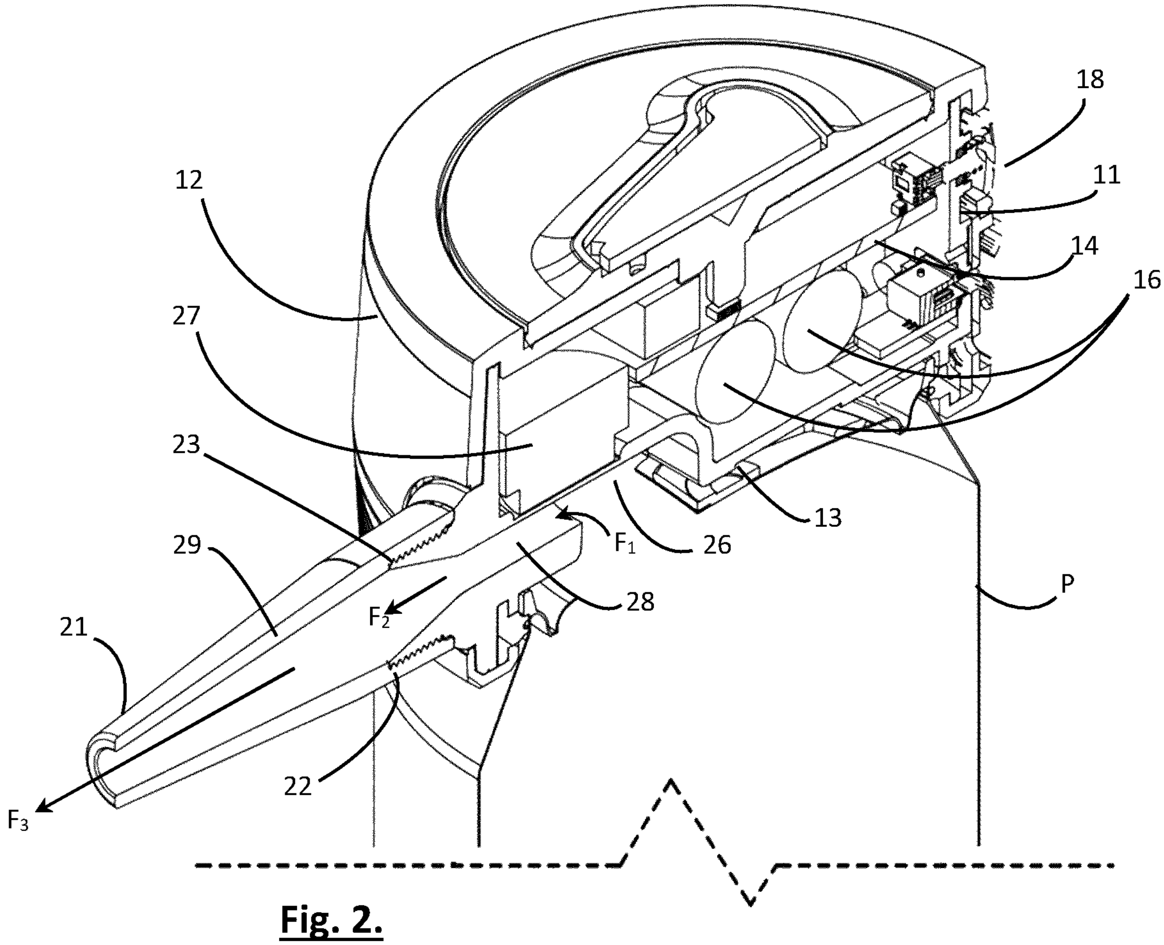
FIG. 2 illustrates a section perspective view of the device.
Figure 3:
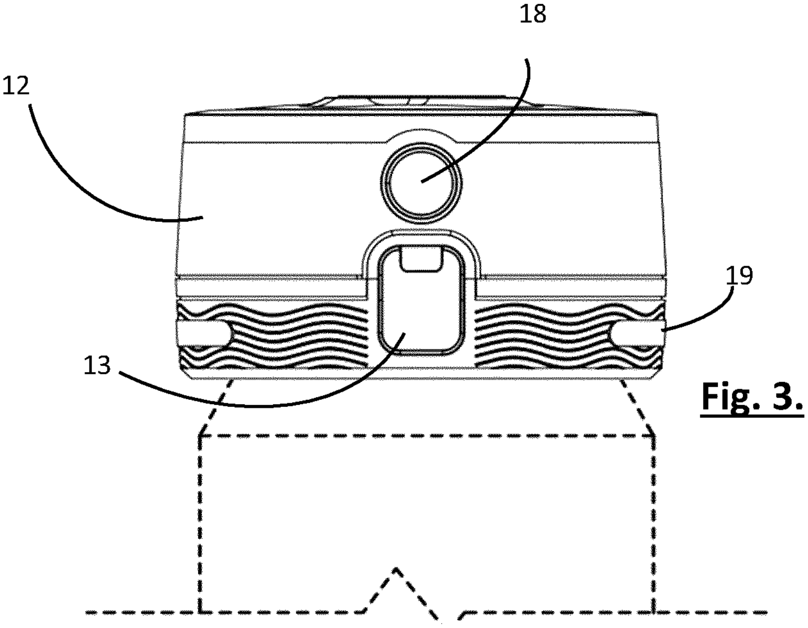
FIG. 3 illustrates a rear elevation view of the device.
Figure 4:
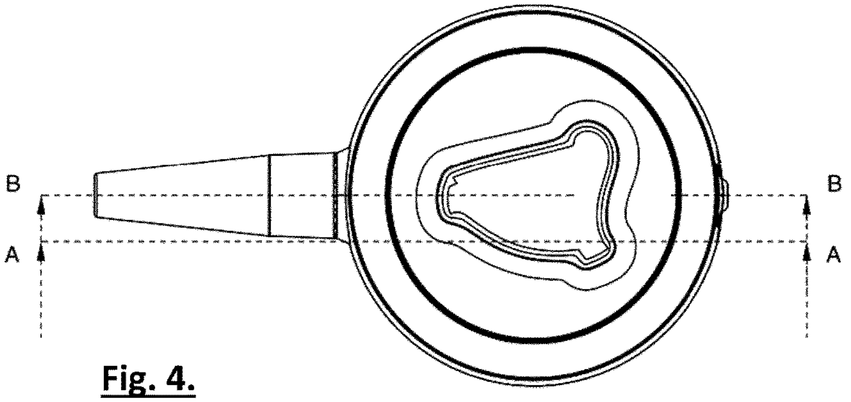
FIG. 4 illustrates a plan elevation view of the view.

FIG. 2 illustrates a section view of the device installed upon and sealed against an annular rim of a beverage package P. The beverage package P is opened using a conventional pull tab that forms a mouth through which beverage can flow into a recessed liquid chamber 26 formed into the floor 13 of body 11. The mouth of the package P should be aligned with recess 26, possibly with the assistance of external markings on the housing and/or the beverage pack itself. For example, a vertical line on the beverage pack may align with the nozzle, since the mouth of the package will be hidden once the pouring device is in place. An inlet beverage flow path from the package P is denoted $F_1$.

Figure 9:
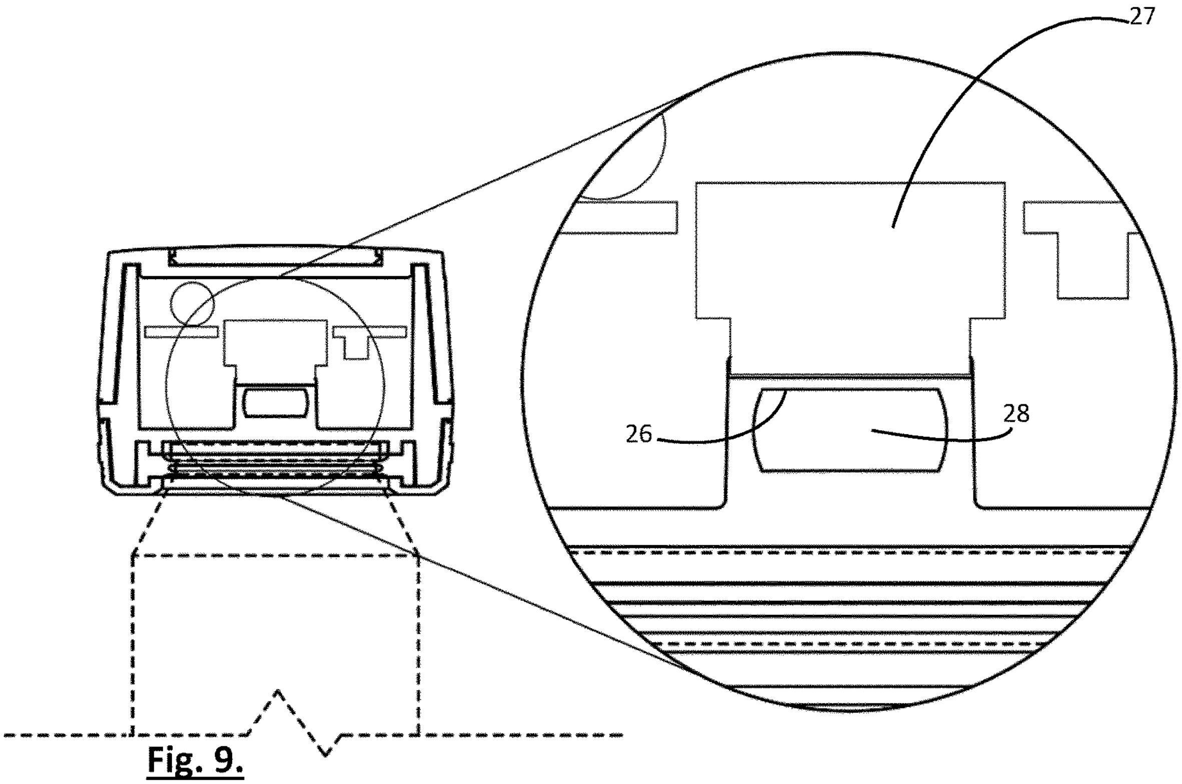
FIG. 9 illustrates a section view of the device, with further enlarged detail of a flow path and transducer.

An ultrasonic generator means 27 is located against the floor wall 13/chamber 26 and in close proximity to flow path $F_1$. The excitation surface of generator 27 at least overlaps, or is wholly coincident with, a first length/cross-section 28 of the flow channel leading from chamber 26. In the illustrated form cross-section 28 is rectangular (i.e. letterbox shape as best viewed in FIG. 9) and provides a resonance chamber where one of its broad sides is in contact substantially directly with generator 27, through a wall of recess 26, to ensure efficient energy transfer. In one form generator 27 may be glued directly to a wall forming the flow path. Walls of recess 26 are contoured to direct beverage flow $F_1$, in a manner that minimises turbulence, smoothly toward cross-section 28.

Downstream of cross-section 28, according to FIG. 2, the flow path widens at $F_2$. In other words, the bore optionally tapers outwardly as the conduit transitions from a letterbox configuration (shown in FIG. 9) to a circular cross-section associated with an outlet end of nozzle 21. As illustrated, a first length of the flow path extending from chamber 26 maintains a restricted cross-section, then transitions to a second section/length where the cross-sectional area increases across the direction of flow, causing a reduction in flow velocity.

Nozzle 21 is conical shaped, with a corresponding frusto-conical internal tubular wall 29, that gradually tapers/narrows the widened circular cross section at $F_2$ towards the ultimate outlet $F_3$ for beverage before delivery to an external vessel (not shown). Accordingly, this third length of the flow path gradually reduces in cross-sectional area, always with the purpose to minimise overall turbulence of the poured liquid and associated "large" bubbles, as opposed to the much smaller bubbles associated with ultrasonic excitation.

In alternative forms the second widening length/section may be omitted. The primary design consideration is enabling a smooth flow of beverage from the package to the outlet end of nozzle 21, by virtue of walls of the flow channel smoothly transitioning between cross sectional areas. Ultimately, the cross-sectional area (e.g. circle) at the nozzle outlet is considerably less that the elongate area of the resonance chamber.

In terms of a cross-section transverse to a direction of flow, according to the illustrated first embodiment, a flow channel $F_1$ with a first consistent cross-section begins proximate an ultrasonic transducer, transitions to a second widening cross-section $F_2$, then transitions to a third reducing cross section $F_3$. In profile, the flow path beings at a first section of constant height, tapers outwardly in a second section, then tapers inwardly in a third section. In terms of scale, the length of flow path of beverage from the centre of the transducer to the distal/outlet end of nozzle 21 is approximately 40 mm and should be long enough to facilitate smooth transition and minimise turbulence.

In the illustrated example, the resonance chamber (the first length/section of flow path) may have approximate dimensions of 9.2×4.2 mm (38.6 $mm^2$ cross sectional area) at $F_1$. The ratio of width to height of the resonance chamber, in the example, is 1:2.2, i.e. in a range of 1:1.5 to 1:2.5. During the second length the cross section widens to a 10.5 mm diameter bore (86.6 $mm^2$) at 23, $F_2$. The outlet nozzle 21 may narrow to 5.0 mm diameter (19.6 $mm^2$). As such, the transitional cross-sectional area of the second length may increase approximately twofold, e.g. 1:1.5 to 1:3, from the resonance chamber to inner outlet 23. The illustrated example increases 1:2.24.

As mentioned, the primary consideration of the total flow path $F_1$ to $F_3$, i.e. from entrance to the device from the package through to final egress, is to maintain a smooth transition and minimise turbulence. Meanwhile, generator 27, via ultrasonic waves, introduces cavitation of nitrogen gas within the flowing beverage and encourages small, controlled bubble formation for as long as the generator is energised.

Figure 17:
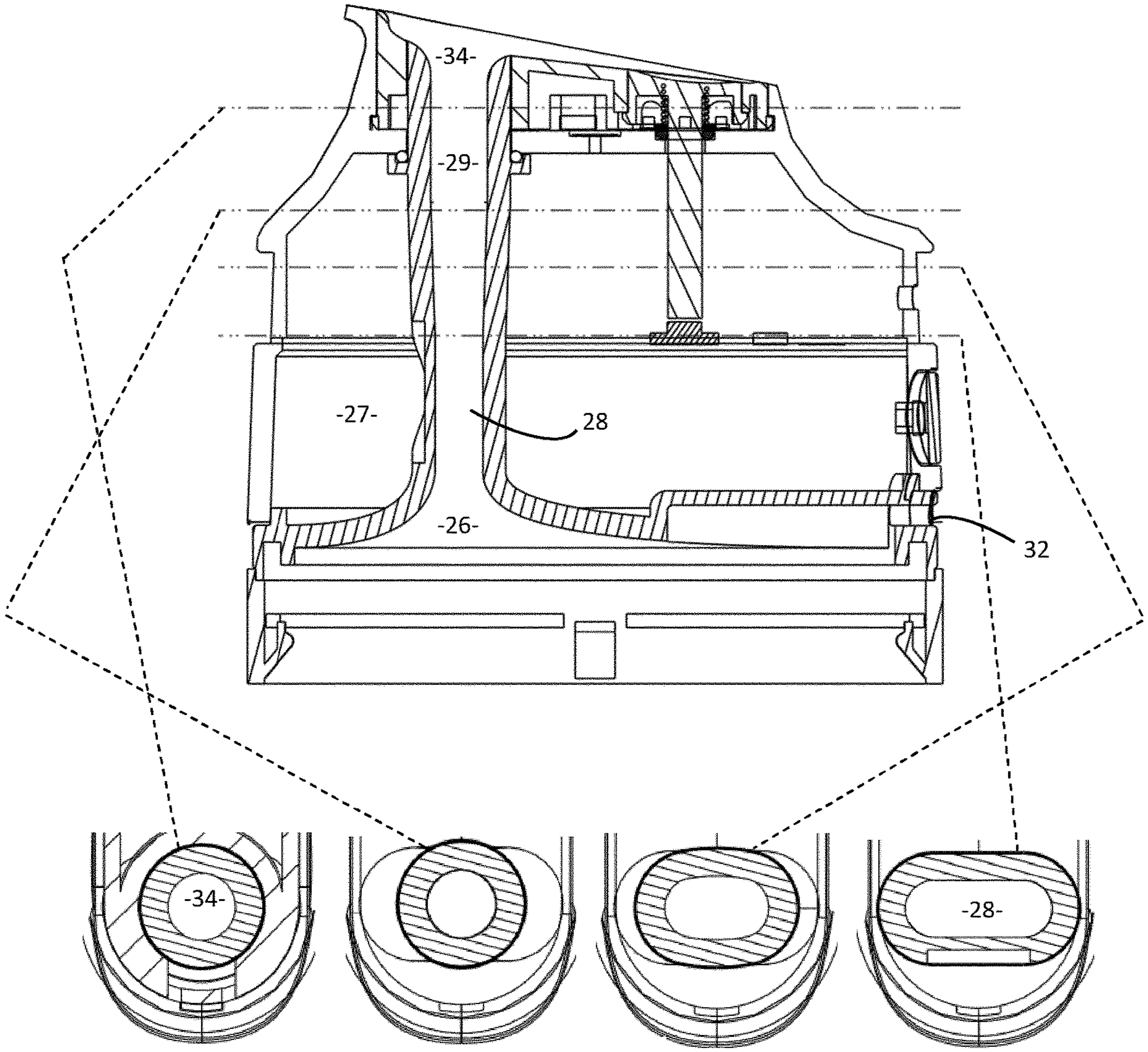
FIG. 17 illustrates a cross section of an alternative pouring device, having a straight flow path from package opening to outlet, also showing cross-section slices through the flow path.

The illustrated form of the invention shows a "horizontal" spout/nozzle configuration relative to the device at rest (and not necessarily during the pouring operation). However, alternative forms (see FIG. 17) may feature a vertical or angled nozzle configuration for dispense. In other words, the flow path may be coincident with or angled from a longitudinal axis of the beverage pack. During pouring the flow path in all embodiments will likely be tilted toward a delivery vessel for dispense, so as to empty the contents of the package.

Figure 5:
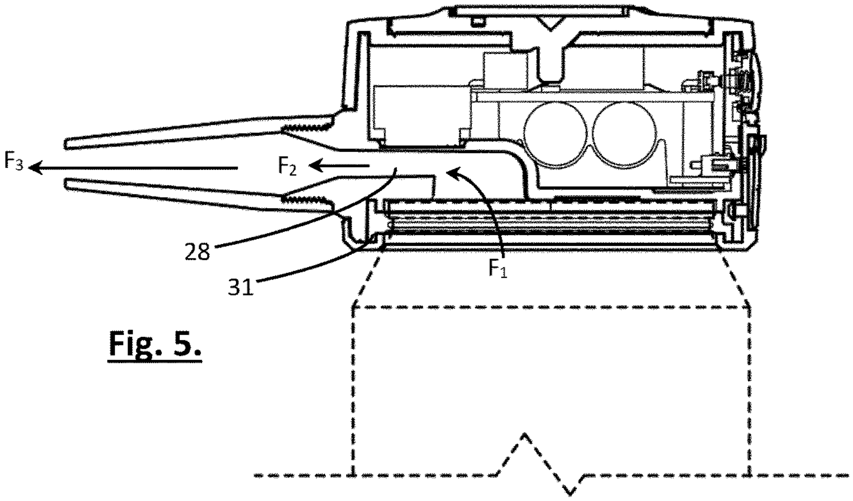
FIG. 5 illustrates a section view of the device, along a line B-B from in FIG. 4.
Figure 7:
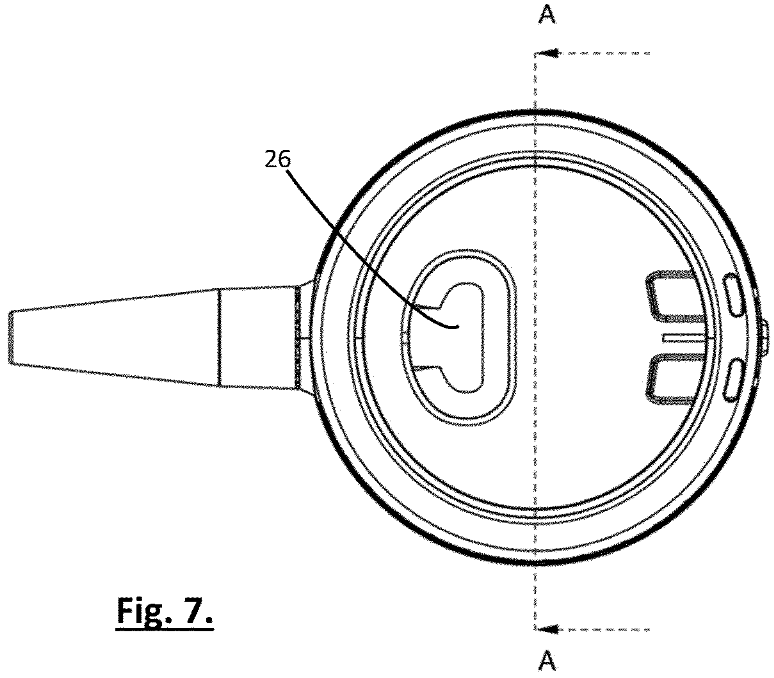
FIG. 7 illustrates an underneath plan view of the device.
Figure 8:
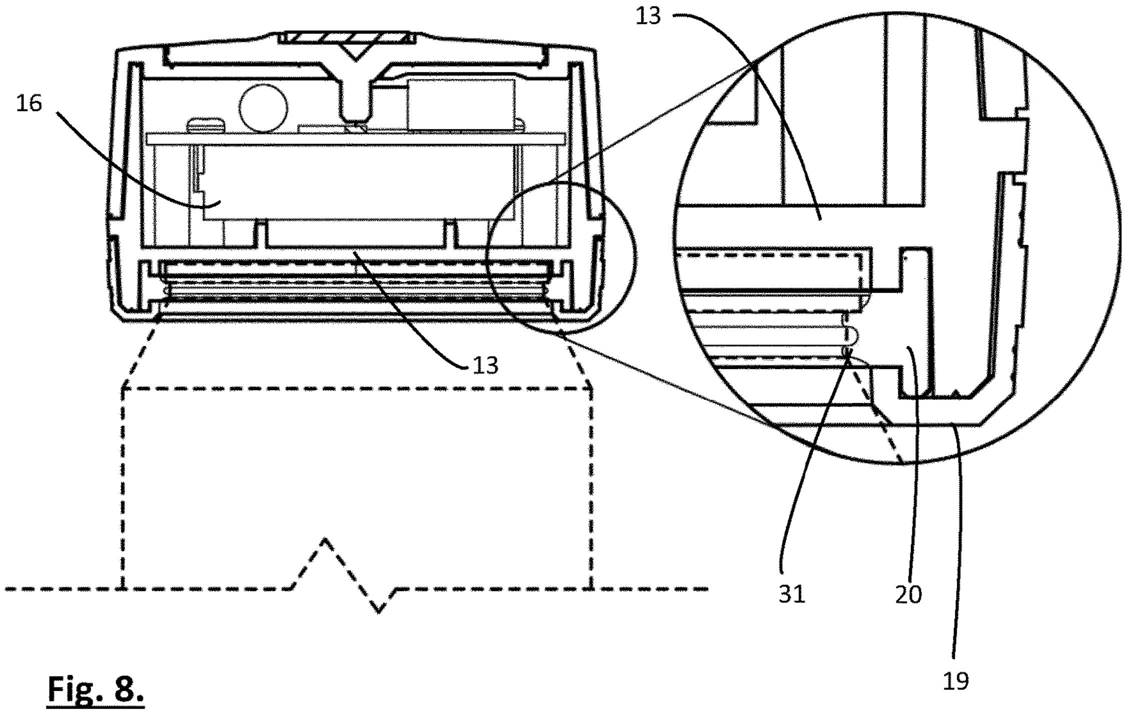
FIG. 8 illustrates a section view of the device, along a line A-A from in FIG. 7, and further showing enlarged detail of an o-ring seal.
Figure 10:
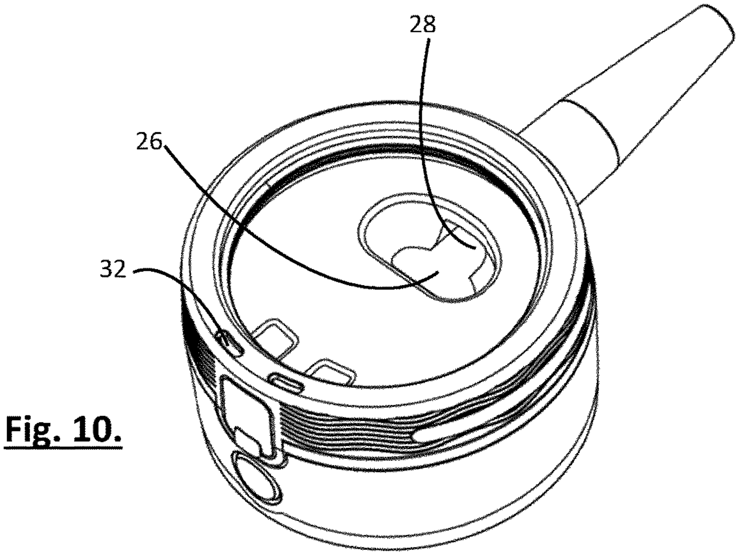
FIG. 10 illustrates an underneath perspective view of the device.
Figure 11:
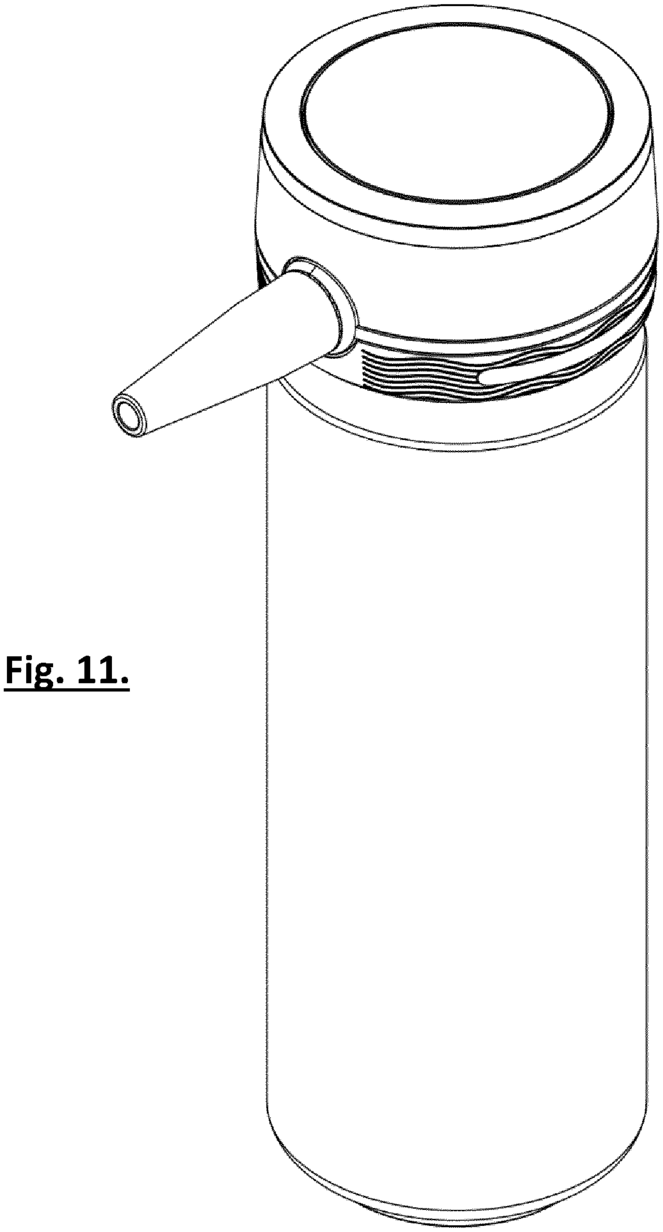
FIG. 11 illustrates an overview of the pouring attachment of the invention, attached to an aluminium can package.

The flow path $F_1$ to $F_3$ is also shown by FIG. 5 and, particularly, an inlet to the cross-section/resonance chamber 28 at the recess 26 is visible in the underneath views of FIGS. 7 and 10. As seen in FIG. 8, a small gap exists between an underneath of main body floor 13 and a top end of the package P and some liquid may flow to fill this space, but it is relatively minimal since most beverage is channelled directly to recess 13 and conduit 28. In alternative forms the flow path $F_1$ to $F_3$ may be a straight line, e.g. vertical, from the beverage pack (see FIG. 17), where the ultrasonic means 27 is positioned directly against a vertical wall of the flow path.

The flow path $F_1$ to $F_3$ of the illustrated embodiment shows a ninety degree turn as beverage exits the opening of package P and enters aperture 28. Future embodiments may feature an upstanding nozzle with a substantially straight flow path from package P to the distal end of nozzle 21. Indeed, any or a variable angle flow path may be implemented that maintains the principle of smooth transition outlined above.

Figure 6:
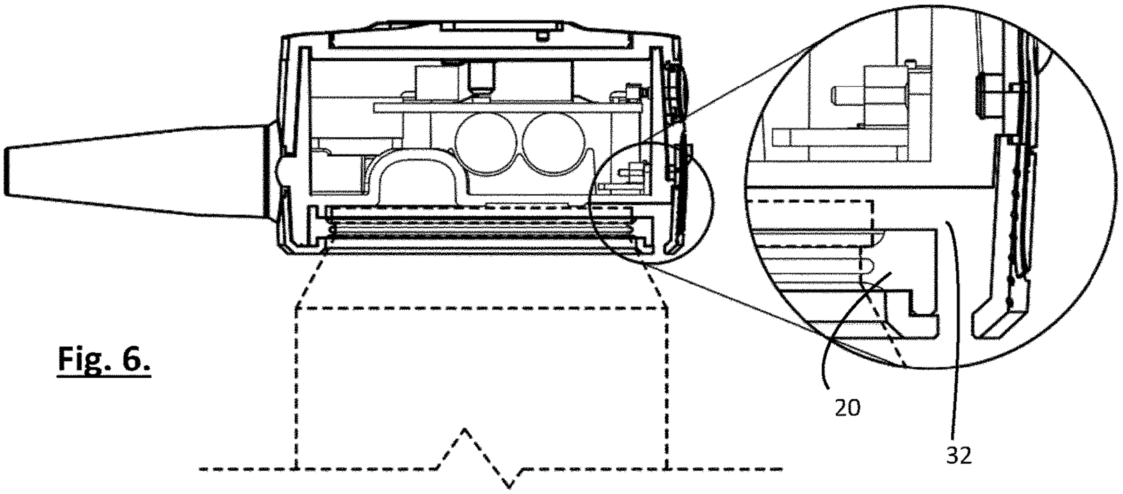
FIG. 6 illustrates a section view of the device, along a line A-A from in FIG. 4, and further showing enlarged detail of a venting aspect and seal.

Details of a coupling mechanism for sealing the pouring attachment to a beverage pack are illustrated by FIGS. 6 and 8. Sealing against a rim and/or side walls of a top end of package P is achieved via a deformable gasket 20. The gasket may have a specific profile, e.g. wipe seals 31, to receive and accommodate a can end in an interference fit. Particularly, two radially protruding wipe seals 31 offer more flex and better accommodate can dimensional tolerances. In use, when an aluminium can is pushed into contact with seal 20, the dual annular flanges 31 deform to allow passage of a can end and to receive/seal against a neck of the container. An innermost seal 31 (relative to housing 11) may engage underneath an edge of the can end (visible in ghost-line in FIGS. 6 and 8) roll-formed onto the aluminium can.

Seal 20 mates with surface features of the underside of wall 13 and is secured by the moulded base 19, which may be welded in place against said wall 13. In one example, seals described herein are made from 50% shore hardness rubber silicone.

In one form of the invention, according to FIG. 6, an L-shaped (in cross-section) vent 32 is incorporated upstream of seal 20, and opposite to the beverage outlet side of the device, that provides for fluid communication between the air gap between the underside of wall 13 and the can/package top. There may be one or a plurality of vents 32 (as seen in FIG. 10), but preferably in a general position diametrically opposed to the nozzle. In this way provision is made for atmospheric air to make its way into the package and avoid back pressure during tilting/pouring, which would slow egress of liquid and, particularly, cause chaotic agitation leading to large bubbles and an undesirable head in the poured product.

Figure 12:
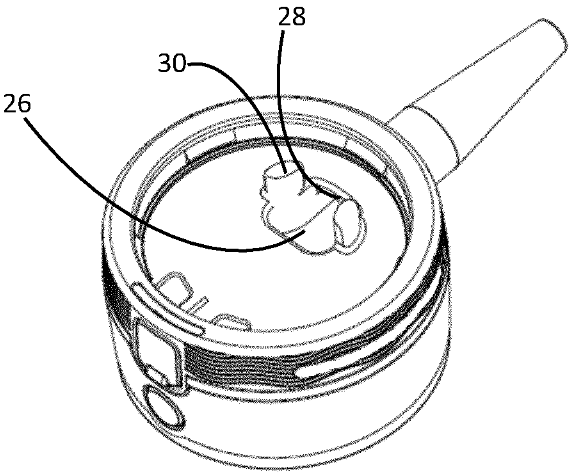
FIG. 12 illustrates an alternative underneath perspective view of the device.

FIG. 12 shows an underneath view of an alternative form of the attachment, where a downwardly extending pair of alignment flanges/protrusions 30 are incorporated with a package-facing side of the device. These flanges assist in positioning, by turning about a longitudinal axis of the package, the inlet chamber/recess 26 directly over an opened mouth of the package.

FIGS. 13 to 16 illustrate an alternative embodiment where the "second section" of widening cross-sectional area in the flow path is generally omitted.

Figure 13:
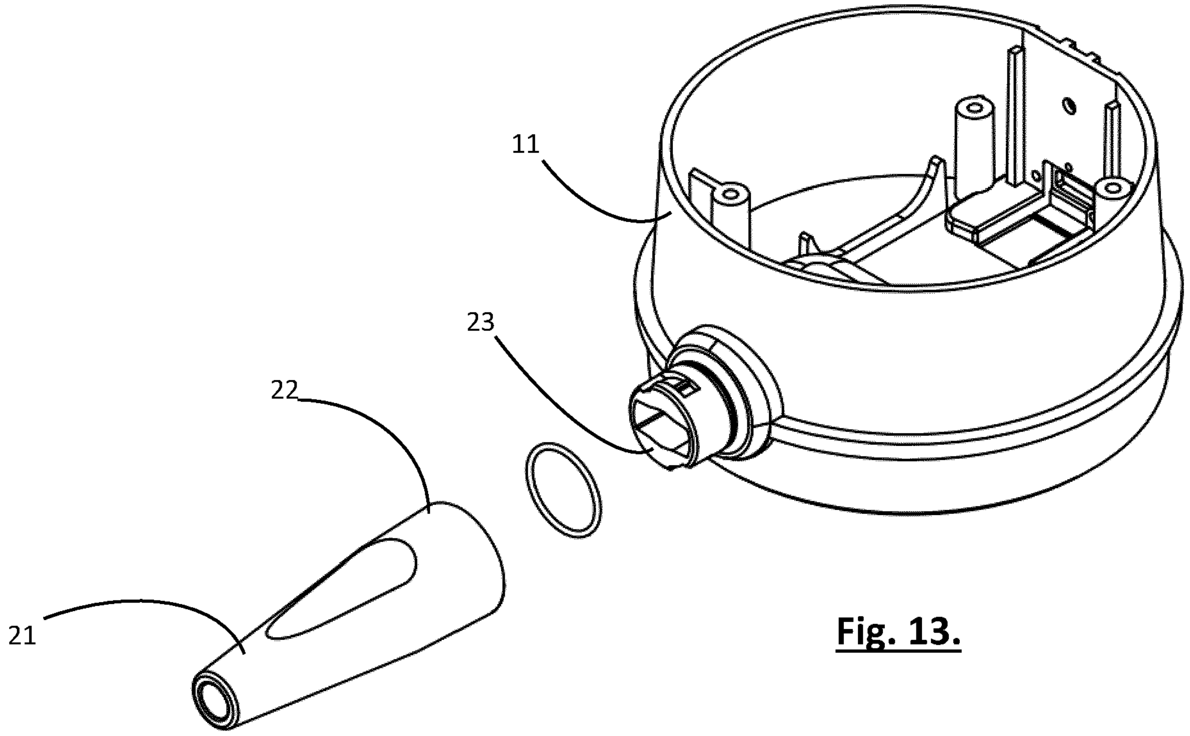
FIG. 13 illustrates an exploded view of an alternative embodiment according to the invention.
Figure 14:
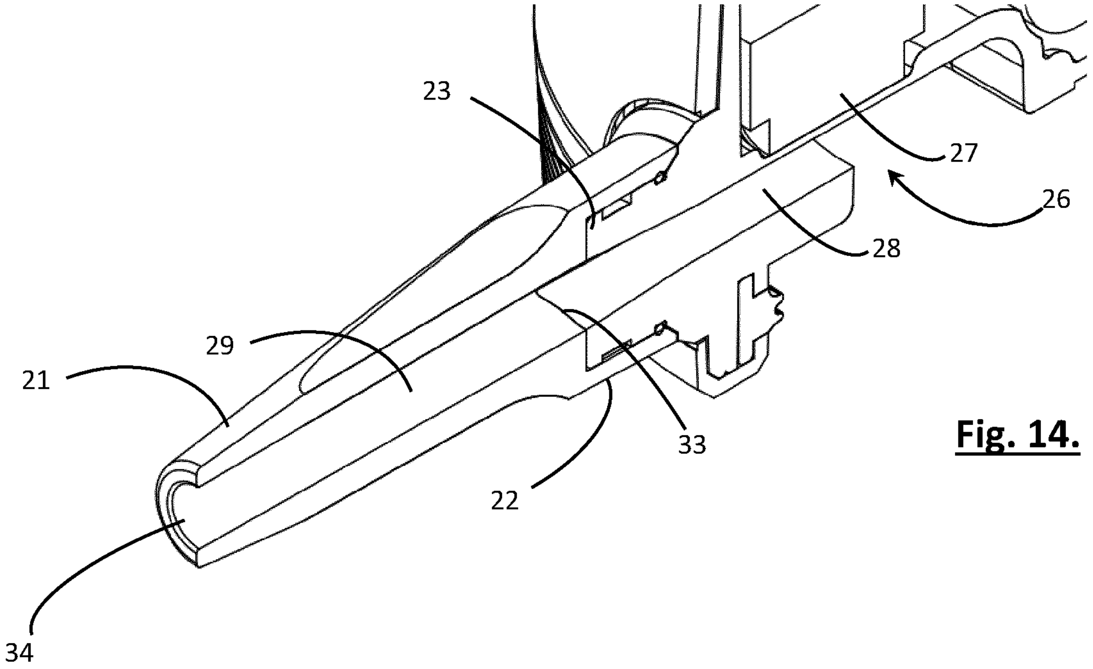
FIG. 14 illustrates a section perspective view of the device from FIG. 13.

It can be seen from FIG. 13 that a device coupling end 22 of nozzle 21 may be attached to outlet 23 of the body 11 by a bayonet type connection. Coupling end 22 also includes an interface opening (not seen in FIG. 13) that is shaped to match the elongate, letterbox or stadium-shaped, flow channel cross-section of device outlet 23. In this way, according to FIG. 14, the resonance chamber (first section 28) may communicate directly with the internal tubular wall 29 of nozzle 21. Wall 29 is contoured to smoothly transition from an interfacing letterbox cross sectional shape at join 33 to a substantially narrowed nozzle outlet 34 which, in the illustrated embodiment, is circular.

Plan view FIG. 16 shows that the cross section of flow path/walls 29 narrows toward outlet 34. Nozzle 21 should have sufficient length to ensure a gradual transition of narrowing cross sectional area that minimises turbulence in the poured liquid. A series of cross sections, from the outlet end to the resonance chamber, are shown left to right across FIG. 16. It is clear that the letterbox 28 (far right) will transform in shape, along the length nozzle 21, toward a circular outlet 34 (far left); via intermediate transitional shapes. The relative cross-sectional area at the resonance chamber 28 is, for example, 40 $mm^2$ to 12 $mm^2$ at the outlet 34, a transition of approximately 3 or 4:1.

It has been found that a smooth wall transition from the inlet 26 to the resonance chamber 28, as well as a smooth and narrowed downstream flow path from the resonance chamber, is the best way to minimise turbulence and suits the device for pouring of a nitrogenated beverage. Initial turbulence into the resonance chamber is also avoided by use of a vent as described above. Any undesirable turbulence is otherwise smoothed out by the length of nozzle and its walls that slow the beverage volumetric flow rate and provide settling time. The beverage is not forced out of nozzle because it merely flows under gravity.

FIG. 13 illustrates an alternative "vertical nozzle" embodiment, or more particularly a form of the invention having a straight flow path from a package opening to an outlet, with comparable components and operation to previous embodiments outlined above, namely a transducer 27 arranged closely against a resonance chamber 28 in a flow path for beverage from a disposable package to impart ultrasonic energy thereto. An inlet 26 to the flow path, provided in alignment with an opening of the package, provides a smooth transition so as to minimise turbulence in the beverage flowing toward proximity with the transducer 27. It is noteworthy that the wide, smooth inlet transitions to a first section of the flow path proximate the transducer, which is generally letterbox/stadium shaped and of constant cross section, and subsequently narrows over an outlet length of the flow path (equivalent to walls 29 of nozzle 21). A series of cross sections from the outlet 34 to resonance chamber 28 are shown from left to right in FIG. 17. A generally stadium shaped resonance chamber 28 (far right) of relatively large cross-sectional area transitions, via intermediate cross-sections, toward a generally circular outlet 34 (far left) of considerably reduced total cross-sectional area. The core inventive concept of minimising turbulence is maintained.

A venting area 32 downstream of the beverage package opens into a chamber proximate the flow path inlet, equalising to atmospheric pressure and generally minimising likelihood of turbulence. It is notable that, in use, the device would be tilted in an orientation counter-clockwise (to the pre-use resting position illustrated) so that the "vertical" flow path is oriented horizontally, and toward an upside-down vertical configuration. During this movement the vent will be maintained in an "upward" location so that beverage leaving the generally "downward" location of the flow path is unlikely to flood the vent and leak.

When re-oriented during pouring at an angle toward an "upside down" position from that illustrated, an outlet opening 34 at a distal end of the device housing (as opposed to an extending nozzle) provides egress of beverage that has been ultrasonically excited in its journey through the flow path. Other features of the device may include: an activation button, battery, grip band, USB port, and indicator lights (e.g. an optically transmissive material communicating with an LED on an internal circuit board).

Figure 18:
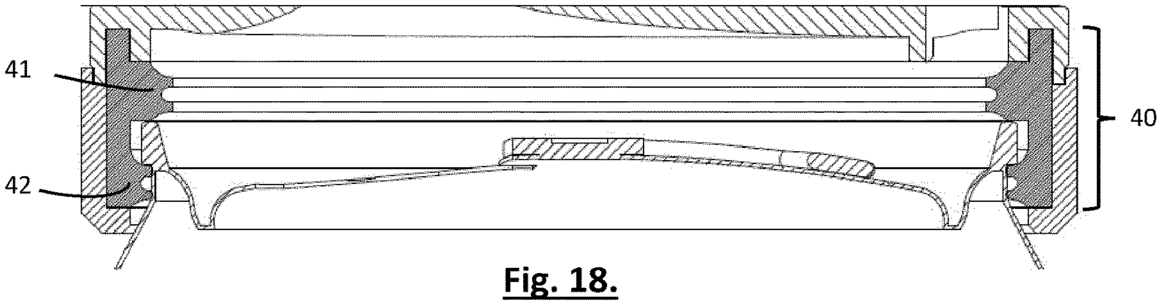
FIG. 18 illustrates an alternative seal arrangement.

FIG. 18 illustrates an alternative seal configuration (which is divisible as an invention and may be combined with earlier embodiments described above). Particularly, the seal 40 may have a "stepped" configuration to accommodate at least two sizes of package diameter.

In practice a first, upper, (wipe-on) seal 41 as illustrated allows for a smaller (e.g. industry code "202" 50 mm diameter) can end to fit thereinto and accommodate a rim thereof to create a liquid tight wipe seal against the can that prevents liquid from dripping down the can sides.

A second, lower, seal 42 allows for a larger (e.g. industry code "200" 52 mm diameter) can end to fit thereinto at a lower position and uses the bottom portion to create a wipe seal under a rim of this can, as illustrated. The second seal 42 is generally concentric with the first and each may feature dual annular flanges that deform to allow passage of a can end and to receive/seal against a neck of the container of corresponding size.

The unique seal configuration 40 is beneficial because it creates a multi-use product that allows for standard cans from 150 mL to 568 mL and in between to pour through the unit in a similar way without changing or adding additional parts or complexity.

By way of summary, the invention as described herein outlines a pouring attachment device for a disposable package of nitrogenated beverage, e.g. an aluminium can P, for achieving a desirable foam head when the beverage is poured into a glass. In one form the attachment comprises a main body or housing 11, a control circuit 14, an ultrasonic wave generator 27 and a means to couple the device to the package, such as a rim seal 20/31. A flow channel 28 has an inlet configured for communicating beverage from the package to an outlet 21 and is particularly adapted for minimising turbulence. Turbulence is minimised by the flow channel having a smooth inlet wall/recess leading to a constant cross-sectional area over a first length, ultimately transitioning (e.g. via a widening portion) to a narrowed cross-section housed in a removable outlet nozzle 21.

The invention claimed is:

1. A pouring attachment device for a disposable container of nitrogenated beverage comprising:
- a housing;
- an ultrasonic wave generator;
- a coupling configured for coupling to a container;
- a flow channel configured for minimizing turbulence of poured beverage, the flow channel comprising:
  - an inlet recess, upstream of the ultrasonic wave generator and configured for communicating beverage from the container toward an outlet, the inlet recess having a contoured wall for directing beverage flow in a manner that minimizes turbulence;
  - a resonance chamber having a first cross sectional area, downstream of the inlet recess, a surface of the ultrasonic wave generator being arranged at least partially overlapping against the resonance chamber;
  - a nozzle having a distal outlet end of reduced cross-sectional area compared to the first cross sectional area; wherein walls of the flow channel are configured to smoothly transition from the resonance chamber, without abrupt or semi-abrupt steps, toward the distal outlet end in a manner that minimizes turbulence, and wherein the nozzle comprises an upstream, elongate cross section transverse to a longitudinal axis of the nozzle, having a width greater than its height, to interface with a corresponding elongate cross section of the resonance chamber.

2. The device of claim 1, wherein the first cross-sectional area is elongate, having a width greater than its height with the width thereof facing against the surface of the ultrasonic wave generator emitting ultrasonic waves.

3. The device of claim 1, wherein the coupling includes at least one of a sleeve or a seal for receiving an external wall of the container.

4. The device of claim 1, wherein the coupling comprises at least one annular seal configured to sealingly engage an annular rim of the disposable container.

5. The device of claim 1, wherein the coupling comprises at least two annular seals, wherein a first annular seal has a first diameter and a second annular seal has a second diameter, greater than the first diameter, thereby configuring the coupling for engaging an annular rim of at least two different sizes of disposable container.

6. The device of claim 4, wherein the at least one annular seal comprises dual flanges.

7. The device of claim 1, including a vent, distal from the inlet recess, for communicating atmospheric pressure to the container.

8. The device of claim 1, including an alignment indicator configured for engaging with, or indicating the location of, an opening of the container.

9. The device of claim 8, wherein the alignment indicator comprises at least one of an upstanding flange or a protrusion located proximate the flow channel.

10. The device of claim 1, further comprising a processor and/or control circuit configured to implement pulsed energy release from the ultrasonic wave generator.

11. The device of claim 1, including a user accessible button for activating the ultrasonic wave generator.

12. The pouring attachment device of claim 1, wherein the nozzle is removable.

13. The pouring attachment device of claim 1, wherein the flow channel is configured to produce, in the poured beverage, a straight flow path from the resonance chamber to the outlet.

* * * * *